United States Patent
Jacoby (10) Patent No.: US 9,185,458 B2
(45) Date of Patent: Nov. 10, 2015

(54) SIGNAL-DRIVEN INTERACTIVE TELEVISION

(75) Inventor: Ronald Jacoby, Saratoga, CA (US)

(73) Assignee: Yahoo! Inc., Sunnyvale, CA (US)

( * ) Notice: Subject to any disclaimer, the term of this patent is extended or adjusted under 35 U.S.C. 154(b) by 121 days.

(21) Appl. No.: 12/977,643

(22) Filed: Dec. 23, 2010

(65) Prior Publication Data

US 2011/0247044 A1 Oct. 6, 2011

Related U.S. Application Data

(60) Provisional application No. 61/320,685, filed on Apr. 2, 2010.

(51) Int. Cl.

| | |
|---|---|
| *H04H 60/32* | (2008.01) |
| *H04N 7/10* | (2006.01) |
| *H04N 7/025* | (2006.01) |
| *G06F 3/00* | (2006.01) |
| *G06F 13/00* | (2006.01) |
| *H04N 5/445* | (2011.01) |
| *H04N 7/173* | (2011.01) |
| *H04N 21/443* | (2011.01) |
| *H04H 60/43* | (2008.01) |
| *H04N 21/81* | (2011.01) |
| *H04N 21/462* | (2011.01) |

(Continued)

(52) U.S. Cl.
CPC ............. *H04N 21/443* (2013.01); *H04H 60/43* (2013.01); *H04N 7/17318* (2013.01); *H04N 21/4351* (2013.01); *H04N 21/4622* (2013.01); *H04N 21/812* (2013.01); *H04N 21/8166* (2013.01); *H04N 21/6125* (2013.01); *H04N 21/6175* (2013.01)

(58) Field of Classification Search
None
See application file for complete search history.

(56) References Cited

U.S. PATENT DOCUMENTS

| | | | | |
|---|---|---|---|---|
| 6,263,505 | B1 * | 7/2001 | Walker et al. | 725/110 |
| 7,565,327 | B2 * | 7/2009 | Schmelzer | 705/67 |
| 7,665,109 | B2 * | 2/2010 | Matthews et al. | 725/51 |

(Continued)

FOREIGN PATENT DOCUMENTS

| | | |
|---|---|---|
| JP | 2009-065551 | 3/2009 |
| TW | 201042945 | 12/2010 |

(Continued)

OTHER PUBLICATIONS

PCT International Search Report and Written Opinion of the International Searching Authority (ISA) issued in International Application No. PCT/US2011/066618, Korean Intellectual Property Office (ISA), May 23, 2012.

(Continued)

*Primary Examiner* — Jonathan V Lewis
(74) *Attorney, Agent, or Firm* — Martine Penilla Group, LLP (57) ABSTRACT

A method for displaying supplemental content with a content stream on a display is provided. A content stream for a program is received, and a portion of the received content stream is sampled. The sampled portion is analyzed to determine a media identifier for the content stream, the media identifier being transmitted to a content server. Supplemental content is retrieved from the content server using the media identifier. And the content stream is rendered on the display with the supplemental content. The supplemental content provides access to an interactive feature, the interactive feature providing internet communication during the receipt of the content stream.

18 Claims, 9 Drawing Sheets

(51) Int. Cl.
*H04N 21/435* (2011.01)
*H04N 21/61* (2011.01)

(56) References Cited

U.S. PATENT DOCUMENTS

| | | | |
|---|---|---|---|
| 7,881,657 B2* | 2/2011 | Wang et al. | 455/3.02 |
| 8,099,755 B2 | 1/2012 | Bajpai et al. | |
| 8,688,999 B2* | 4/2014 | Conwell | 713/176 |
| 2002/0162121 A1* | 10/2002 | Mitchell | 725/135 |
| 2002/0199189 A1* | 12/2002 | Prijatel et al. | 725/36 |
| 2004/0128702 A1* | 7/2004 | Kaneko | 725/137 |
| 2004/0268413 A1 | 12/2004 | Reid et al. | 725/131 |
| 2005/0066352 A1* | 3/2005 | Herley | 725/19 |
| 2005/0086682 A1* | 4/2005 | Burges et al. | 725/19 |
| 2006/0090179 A1* | 4/2006 | Hsu et al. | 725/17 |
| 2007/0011699 A1* | 1/2007 | Kopra et al. | 725/22 |
| 2007/0124756 A1* | 5/2007 | Covell et al. | 725/18 |
| 2007/0237106 A1 | 10/2007 | Rajan et al. | |
| 2007/0294721 A1* | 12/2007 | Haeuser et al. | 725/34 |
| 2008/0015932 A1 | 1/2008 | Haeuser et al. | |
| 2008/0288600 A1 | 11/2008 | Clark | |
| 2009/0070324 A1 | 3/2009 | Yoshino | |
| 2009/0133084 A1* | 5/2009 | Ramsdell et al. | 725/114 |
| 2009/0158318 A1* | 6/2009 | Levy | 725/32 |
| 2009/0199098 A1 | 8/2009 | Kweon et al. | |
| 2010/0077428 A1* | 3/2010 | Arnold et al. | 725/34 |
| 2010/0119208 A1* | 5/2010 | Davis et al. | 386/83 |
| 2010/0169911 A1* | 7/2010 | Zhang | 725/19 |
| 2010/0254674 A1 | 10/2010 | Prestenback et al. | |
| 2010/0261424 A1 | 10/2010 | Mittal et al. | |
| 2011/0041154 A1* | 2/2011 | Olson | 725/54 |
| 2011/0119726 A1* | 5/2011 | DeLorme et al. | 725/116 |
| 2011/0247042 A1* | 10/2011 | Mallinson | 725/86 |
| 2011/0283328 A1* | 11/2011 | Davis et al. | 725/62 |
| 2013/0198768 A1 | 8/2013 | Kitazato | |
| 2014/0201769 A1* | 7/2014 | Neumeier et al. | 725/14 |

FOREIGN PATENT DOCUMENTS

| | | | | |
|---|---|---|---|---|
| TW | 201043036 | | 12/2010 | |
| WO | WO 2009143667 A1 * | | 12/2009 | H04N 7/173 |
| WO | 2012088308 | | 6/2012 | |
| WO | 2013021824 | | 2/2013 | |

OTHER PUBLICATIONS

Extended European Search Report and European Search Opinion issued in European Application No. 11851954.5, dated Apr. 14, 2014 (7 total pages).

Taiwanese Office Action (with English translation) issued in corresponding Taiwanese Patent Application No. 100147650, dated Dec. 9, 2014.

English translation of Notification of Reason(s) for Rejection issued in corresponding Japanese Application No. 2013-546389, dated Nov. 10, 2014.

* cited by examiner

SIGNAL-DRIVEN INTERACTIVE TELEVISION

RELATED APPLICATIONS

The present application is related to U.S. provisional patent application No. 61/320,685, filed Apr. 2, 2010, entitled "METHODS AND SYSTEMS FOR DISPLAY DEVICE WIDGET ACCESS AND DEVICE MANAGEMENT," and to U.S. patent application Ser. No. 12/894,569, filed Sep. 30, 2010, entitled "SYSTEM AND METHOD FOR CONTROLLING A NETWORKED DISPLAY," and to U.S. patent application Ser. No. 12/982,811, filed Dec. 30, 2010, entitled "ENTERTAINMENT CONTENT COMPANION APPLICATION FOR INTERFACING WITH TELEVISION CONTENT", by inventors David Mowrey and Laura Poffenberger, the disclosures of which are herein incorporated by reference in their entirety for all purposes.

BACKGROUND

1. Field of the Invention

The present invention relates to methods and systems for providing augmented television services based on detected content of a program content stream.

2. Description of the Related Art

Existing broadcast streams may contain machine-readable semantic information or metadata that is relevant to the program and the viewer. For example, the ATSC digital broadcast specification includes information on the current program in the broadcast stream. However, this information is limited in two important ways. First, the content encoding is not provided at a sufficient level of granularity to enable a CTV service to determine what is being viewed moment by moment. Second, and more definitively, is the fact that the vast majority of televisions receive information through a Set Top Box (STB) that does not pass this information to downstream devices, such as the television (TV).

The market for television sets is extremely price-sensitive. In order to sell at scale the Bill of Materials (BOM) for a television set must be low enough to enable competitive retailing. This means that it is cost-prohibitive to offer additional services by way of expensive hardware in the television set itself that would help to deliver valuable new services.

There are existing and widely implemented methods of delivery for television programming, such as cable TV systems, satellite delivery systems, and conventional terrestrial broadcast systems. Enhanced services must work well with content delivered through all of these delivery mechanisms.

In theory, one could more easily enhance television programming if it were entirely digital, and delivered in packet format through IP networks. However, the current state (and for some time to come) of Internet bandwidth severely limits the amount of programming and the number of recipients that could be served in this manner. For example, the World Series, or even a modestly successful network television show, could not be delivered to the audience demanding it, as there does not exist enough bandwidth to accommodate the flow of data required for these programs. Therefore, achieving the delivery of relevant, valuable enhanced services in this manner is a nonstarter, except in experimental or "boutique" services.

At the user interface level, the availability of enhanced services can be completely overlooked by the user, because the interactive services may not be visible onscreen during broadcast. Users typically like their programming to occupy the entire screen, and therefore no overlay or other controls will be visible to let the viewer know a service is available, thus limiting the uptake and value creation (for user, broadcaster, and service provider) that enhanced, interactive television services can provide.

It is in this context that embodiments of the invention arise.

SUMMARY

Embodiments of the present invention provide methods and systems and described for providing signal-driven interactive television services. Several inventive embodiments of the present invention are described below.

In one embodiment a method is provided for displaying supplemental content on a display. The method includes method operations of receiving a content stream for a program, and sampling a portion of the received content stream. The sampled portion is analyzed to determine a media identifier for the content stream, the media identifier being transmitted to a content server. Supplemental content is retrieved from the content server using the media identifier. The content stream is rendered on the display with the supplemental content. The supplemental content provides access to an interactive feature, the interactive feature providing internet communication during the receipt of the content stream.

In one embodiment, the media identifier defines a unit of content in which the sampled portion is found. In one embodiment, the media identifier defines a location within the unit of content at which the sampled portion is found.

In one embodiment, the supplemental content defines a trigger for accessing the interactive feature. In one embodiment, the interactive feature is provided by an application, the application being activated by the trigger.

In one embodiment, the analysis of the sampled portion entails generating a fingerprint of the sampled portion and determining, based on the fingerprint, the media identifier for the content stream.

In one embodiment, the content stream is received via a first channel, and the supplemental content is retrieved via a second channel. In one embodiment, the first channel is defined by a communication type such as analog audio/video, digital audio/video, cable, satellite, or internet; and the second channel is defined by internet communication.

In another embodiment, a method if provided for a content server to provide supplemental content to a display. According to the method, supplemental content is determined using a media identifier for a content stream, the media identifier being determined based on analysis of a sampled portion of the content stream. The supplemental content is transmitted to a rendering module, the rendering module rendering the content stream on the display with the supplemental content. The supplemental content provides access to an interactive feature, the interactive feature providing internet communication during the receipt of the content stream.

In another embodiment, a system is provided for displaying a content stream with supplemental content on a display. The system includes a content server for providing supplemental content, and an interface device, the interface device including a connected interface module. The connected interface module includes (a) a sensor module for receiving a content stream for a program, sampling a portion of the received content stream, and analyzing the sampled portion to determine a media identifier for the content stream; (b) a supplemental content module for retrieving supplemental content from the content server using the media identifier; and (c) a rendering module for rendering the content stream on the display with the supplemental content, wherein the supplemental content provides access to an interactive feature, the interactive feature providing internet communication during the receipt of the content stream.

In another embodiment, a system is provided for displaying a content stream with supplemental content on a display. The system includes a content server for providing supplemental content, and a display, the display including a connected interface module. The connected interface module includes: (a) a sensor module for receiving a content stream for a program, sampling a portion of the received content stream, and analyzing the sampled portion to determine a media identifier for the content stream; (b) a supplemental content module for retrieving supplemental content from the content server using the media identifier; and (c) a rendering module for rendering the content stream on the display with the supplemental content, wherein the supplemental content provides access to an interactive feature, the interactive feature providing internet communication during the receipt of the content stream.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which.

DETAILED DESCRIPTION

A modern connected television (TV) or display is capable of connecting to a network such as the Internet to send and receive data. Such connectivity enables access to a rich diversity of content which is available over the Internet, beyond that which is available through normal television programming sources, such as cable and satellite television providers. Connected TVs may include various applications which are configured to execute on the television and make content available to a viewer using the television as an interface device. Examples of applications which may be executed on a connected television are described in U.S. provisional patent application No. 61/320,685, filed Apr. 2, 2010, entitled "METHODS AND SYSTEMS FOR DISPLAY DEVICE WIDGET ACCESS AND DEVICE MANAGEMENT," the disclosure of which is herein incorporated by reference in its entirety for all purposes.

According to one embodiment of the invention, in order to deliver enhanced, signal-driven interactive television (SDIT) programming, a set of services is implemented atop a television set's operating system. In addition to providing a set of apps (or widgets) that reside in a dock that users may initiate the viewing of, the system listens for signals indicating, for example, the programming that is currently being viewed.

The signals may include: the channel viewed, the program viewed, the point within the program, the rate of channel switching, cumulative viewing of a particular category of programming, muting of programs, frequency, duration, and point of mute, VCR recording instruction (which program will viewer record), Peak viewing times (or generally, a record of viewing activity). Note that it is assumed that all such data contained in signals will be authorized for interpretation and further action by the viewer, in accordance with privacy policies accepted by the viewer.

These signals may come from several sources, including: the set top box, content streaming through the system that may contain semantic encoding, or a remote control app running on another device (e.g., an smartphone).

The signals are gathered by a signal manager, which sends them through the TV's Internet connection to a signal interpreter, which compares them to stored content metadata to determine what the programming is and is related to. For example, the signal manager may periodically sample the program stream, and compute for each sample a digital "fingerprint" or code that may be used to identify the associated content. That fingerprint is sent through the Internet connection to the signal interpreter, which may compare that with a database of such fingerprints, to determine a) what program is being viewed and b) what point within the program has been (recently) viewed. With this information, the signal interpreter communicates with any of a number of service provisioning systems, to acquire services to present to the viewer, or to store data that may be useful in determining what services to provision. These may include, without limitation, an ad server, a user data store, or a general service provisioner, offering programs, content, or interactive functionality of potential interest to the viewer.

When the signal interpreter has determined what to offer to the user, it communicates this information (including any app functionality required) through the Internet to the SDIT client's signal manager. The signal manager then dispatches an instruction to the relevant app to display itself and its service offering to the viewer. At this point, the viewer may elect to utilize the proffered service, decline, or do nothing, in which case the service proffer will eventually time out and disappear from view.

In this way, embodiments of the invention provide for semantic understanding of the programming streaming through the viewer's television set, by obtaining and interpreting signals relating to that programming, and selecting relevant services to offer in response.

Figure 1:
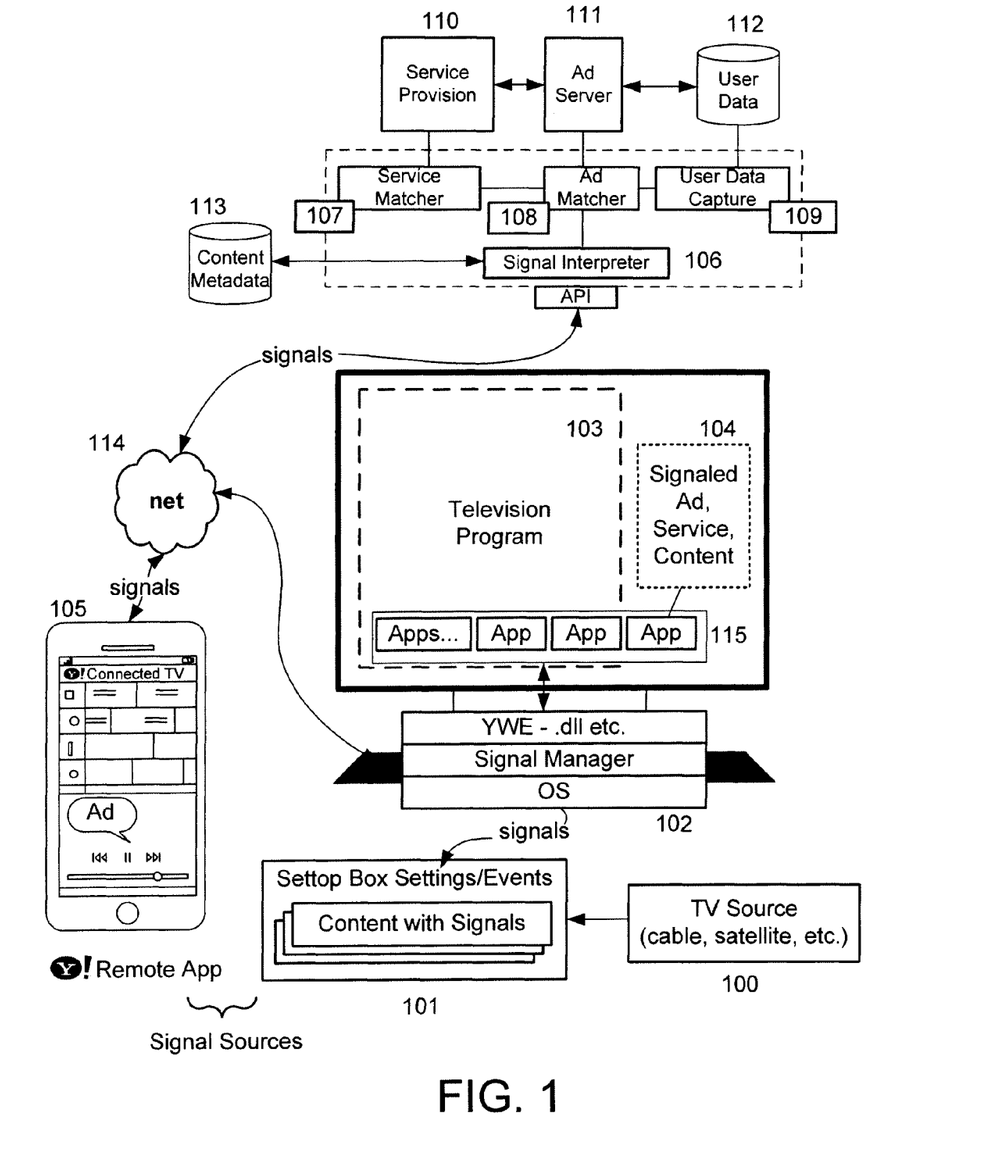
FIG. 1 illustrates a system for providing signal-driven interactive television (SDIT), in accordance with an embodiment of the invention.

FIG. 1 illustrates a system for providing signal-driven interactive television (SDIT), in accordance with an embodiment of the invention. A TV Source 100 provides a television signal, such as a cable or satellite television signal. Potentially, content streamed from this source may contain encoded information designed to identify copyright infringement, for example, or to aid in identifying and tracking distribution of the content. This information, also known as a digital watermark, may be interpreted by the SDIT system as actionable signals in determining what services to proffer to the viewer.

A set-top box (STB) 101 or set-top unit (STU) is a device that connects to a television and an external source of signal, turning the signal into content which is then displayed on the television screen or other display device. Content with signals (if any) pass through the STB, and the user interacts with the STB to indicate what programming he or she wishes to view, or to use other functions it may offer.

SDIT software 102 is a stack that, in a connected TV implementation, includes, atop the TV's operating system, a widget engine (such as the Yahoo! Widget Engine) and API, enabling communication between widgets (software providing enhanced services or content), the Internet, and the television set. This is where the signal manager of the SDIT system resides. It is software that is capable of detecting signals from a variety of sources, and dispatching them to the SDIT signal interpreter (106) for further processing, and receiving instructions back from the signal interpreter, enabling the signal manager to activate service or content offerings to the viewer.

Note that, given the bi-directional connection between the signal interpreter 106 and the STB 101, as mediated by the SDIT Software 102, in one embodiment, the signal interpreter could entirely direct the operation of the TV. And by extension, any device capable of connecting (in an authorized way) with the signal interpreter 106, such as a remote control app 105 located on a mobile phone, could direct the operation of the STB 101, and hence, determine what is displayed to the viewer. There may be, in practice, limitations on privileges available to various devices connected through this loop, but these would be a result of product design decisions, rather than the result of any technical limitations. This is important in considering the provenance of signals that may be interpreted in determining what services to offer the viewer.

It is important to note that while a bi-directional connection may be implemented, it is not required. In most cases the SDIT is expected to operate in a mode where it is receiving only a video raster and PCM encoded audio over an HDMI (or component) link. This uniquely enables ways to determine the nature of and interact with the programming despite the lack of any metadata travelling between the STB and TV (or external TV device).

The signal manager in 102 also acts as a queuing and dispatch manager. In the event that multiple ads, service offerings, or related content are determined as relevant to the viewer of a particular program, the signal manager may determine the sequence in which these contending offerings may be displayed to the viewer.

Television program 103 is the video programming visible to the viewer. The specific content may be determined by the viewer, using any form of direct or remote control, or by the signal manager, as directed through the agency of the signal interpreter 106. The most likely interaction is that the user is controlling the programming directly using the remote control of the STB (e.g. a cable or satellite television handheld remote control).

Signaled services 104 are services overlaid or otherwise appearing on the TV screen as a result of the interpretation of signals by the SDIT system. They may include such things as, without limitation: advertisements, information related to the current television program 103, product offers, communication with other viewers currently viewing the same television program, or any other service, communication, advertising, or commerce function.

It is noted that these are distinct from application/widget functions installed in the resident SDIT dock 102, activated by the actions of the viewer. Instead, a signaled service is one that appears or is otherwise offered as a result of the interpretation of signals emanating from any of the sources, rather than by direct actions of the viewer.

A remote control app 105 is an application running on an Internet connected device, such as a smartphone, tablet, etc, that communicates via the Internet to the signal interpreter 106. Such an app would have access to any service or information available to any such device on the Internet, and moreover be able to control the television's STB 101, through the circuit that routes through the TV-resident signal manager 102. The remote control app is a rich interface to the television, without adding any additional expense or software to the set itself. Moreover, it is capable of generating a wide variety of signals through various user-controlled operations, such as program selection, comments, communications with other viewers, ratings, sharing, purchasing, and so on. Additionally, the remote control app provides a very rich user interface to any of the signaled services 104, or the apps 115 installed in the form of widgets on the SDIT dock.

A signal interpreter 106 receives signals from various sources and executes logical instructions to determine what to do with them. For example, when the signal interpreter is informed by the signal manager that the user has selected Program A, as represented by a unique program code (e.g., Monday Night Football: Program #11111) it may first obtain additional semantic information relating to the signal by looking up the signal in a content metadata database 113. There it can determine the category of the programming, for example, it's frequency of presentation, ratings, etc.

The signal interpreter, thus armed with relevant metadata, may present the program code and relevant metadata—or even just select metadata, such as programming category—to a connected ad server 111. ad server 111 looks up a table of ads that have been purchased to run alongside Monday Night Football, and returns the URL of an ad that has bid the most for, or is otherwise determined as the correct ad to be shown the viewer. The signal interpreter 106 returns the URL of the ad to the Signal Manager, which provides it as a parameter to a resident APP 102, which is thereby activated, loading the content found at the ad URL and displaying it to the viewer.

Similarly, the signal interpreter may present the program code to the service provision component 110, which determines that a fantasy football program could be offered the viewer. The URL for that fantasy football program is returned by the signal interpreter to the signal manager 102, and as for the ad, the offering is activated and shown to the viewer, according to prioritization and sequencing as determined by the signal manager.

It is well worth noting that the signals from a single SDIT set and viewer may be combined with signals from other sets/viewers who may be, for example, identified as "friends" via examination of a social graph. Such cross-viewer signals would make possible other kinds of "social" services, that interpretation of a single, discrete set of signals cannot. For example, if both Alice and Bob watch the television show Fringe, like clockwork every week, and they are friends as determined by an examination of their social graphs, the SDIT can propose that they chat in realtime during the broadcast. Or, the service could offer a set of friends currently viewing the same show, with the option to initiate a chat or other service.

A service matcher 107 is a server-side program that receives signals from the signal interpreter 106, determining, through database lookup or other means, what services may be relevant to the program as indicated in the signal. The ad matcher 108 determines what ads to present the viewer, based upon the received signal, much like a conventional Ad Server on the web.

User data capture 109 captures user data based on the signals received by the signal interpreter 106 which constitute a data rich picture of the user. The selection of programs, viewing hours, level of interactions, "clicks" and rates of channel switching, mutes, recording schedules, and so on may, as authorized by the user through agreement to privacy policy provisions, be captured and utilized to help the signal interpreter 106 to determine the most relevant offerings. User data capture 109 stores these signals in a user data database 112, for further processing. For example, if it is evident that the viewer prefers sports programming over other forms or categories of programming, as evidenced by channel selections made over time, a proportionate weighting may be placed on sports-related advertisements and service offerings.

Service provision 110 is a database of service offerings characterized by metadata about the offerings, enabling the service matcher 107 to determine the most relevant offering in response to a given signal.

Ad server 111 serves ads as suggested by the given signals.

User data store 112 contains user data. Note that this may contain data contributed by a range of services, devices, and activities in addition to the SDIT.

Content metadata 113 is information related to the content as indicated by the signals. For example, a signal may indicate that the viewer is watching program #22222. That program code is used as a key to find the record of metadata for the program. #22222 may be a Sunday morning current events program, for example, and so a code indicating "current events programming" can be obtained by the signal Interpreter from the content metadata store. That information, in turn, would then be used by the signal interpreter in determining what services, ads, or content to offer the viewer.

Net 114 is a network such as the Internet. Apps 115 are specific applications resident atop the SDIT stack, providing various forms of enhanced functionality.

SDIT provides the means for adding a semantic overlay to television programming, by relating it to other metadata, user viewing habits and preferences, and consequently suggested enhanced services and information. It does the without requiring the restructuring or re-encoding of millions of hours of existing programming, thereby increasing the value of all programming to viewers, advertisers, rights holders, and the SDIT operator.

SDIT thereby creates a new venue for value creation, for service providers, content creators, advertisers, and the user. The many millions of daily hours of television programming, currently monetized only through narrowly defined mechanisms, are thus opened up to an array of new and valuable service offerings and viewing enrichments.

SDIT does not requiring any further hardware or expensive add-ons to existing connected TV bills of materials, adding enriched functionality and an enhanced experience while maintaining current levels of competitive pricing. SDIT works with all sources of television programming coming through any delivery medium. It specifically does not require any special encoding or digitization of the programming.

SDIT can deliver enhanced services and value at both the current scale of television consumption, including full peak demand, and beyond, because it does not require programming to be delivered in packetized formats across the Internet.

The signal-driven user interface ensures that viewers will be made aware of enhanced service offerings whenever they are available. In prior implementations, such enhanced services only appeared when users thought to press buttons to invoke them, or left them persistently on the screen. The SDIT makes it possible to have them appear in concert with the programming, delivering an overlay of rich functionality that appears to have been encoded directly into the programming, and requiring no invocation on the part of the user (though they may be subject to predefined user settings).

Figure 2A:
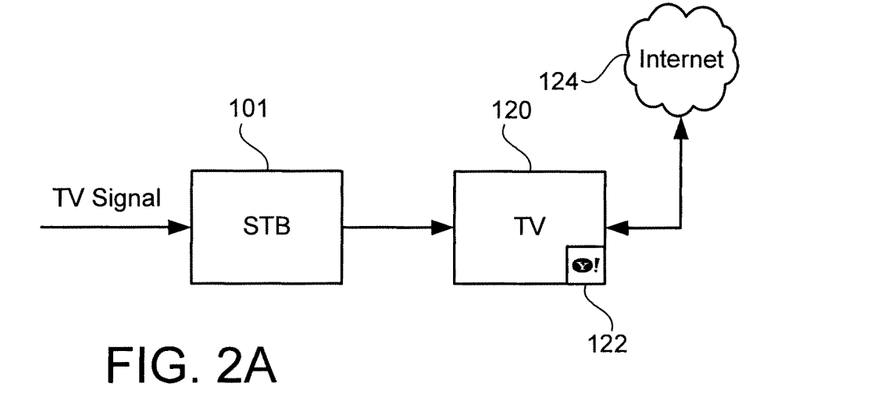
FIG. 2A illustrates a system for displaying supplemental content on a display, in accordance with an embodiment of the invention.

FIG. 2A illustrates a system for displaying supplemental content on a display, in accordance with an embodiment of the invention. A set-top box (STB) 101 receives a TV signal, and transmits a content stream to a display 120. The display 120 may be any of various types of displays which are capable of rendering media content in accordance with embodiments of the invention herein described. Examples of a display 120 include a television, LCD, plasma screen, CRT, DLP, projector, etc. The display 120 includes a connected interface module 122. The connected interface module is connected to the Internet 124, and provides access to interactive features based on media which have been detected in the content stream. Details of the connected interface module are provided further below.

Figure 2B:
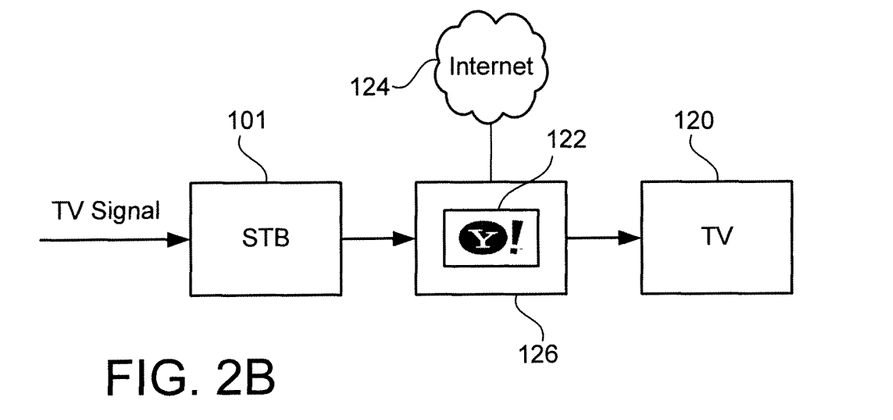
FIG. 2B illustrates a system for displaying supplemental content on a display, in accordance with another embodiment of the invention.

FIG. 2B illustrates a system for displaying supplemental content on a display, in accordance with another embodiment of the invention. The STB 101 receives the TV signal, and transmits a content stream. An interface device 126 connects to the STB 101 and to a display 120. The interface device 126 thus interfaces between the STB 101 and the display 120. The interface device 126 includes a connected interface module 122. The connected interface module 122 determines media content of the content stream transmitted by the STB 101, and connects to the Internet to provide supplemental content based on the media content of the content stream. The interface device 126 provides the content stream with supplemental content to the display 120.

Figure 2C:
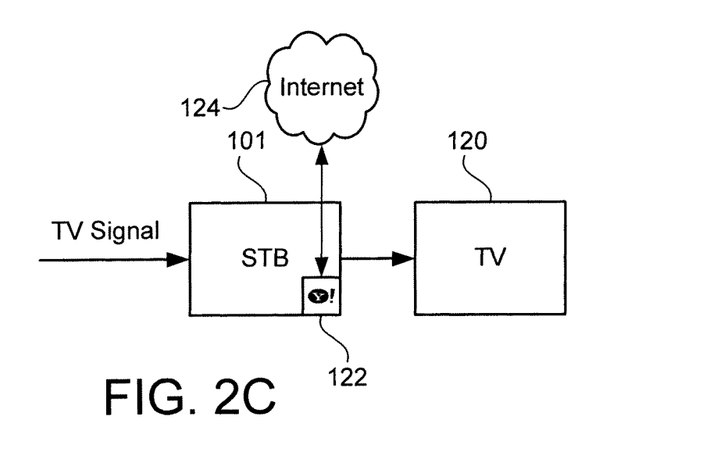
FIG. 2C illustrates a system for displaying supplemental content on a display, in accordance with another embodiment of the invention.

FIG. 2C illustrates a system for displaying supplemental content on a display, in accordance with another embodiment of the invention. In this embodiment, the connected interface module 122 is included as part of the STB 101, the STB 101 receiving a TV signal which includes a content stream. The connected interface module 122 connects to the Internet to retrieve supplemental content based on detected media content of the content stream. The STB provides both the content stream and the supplemental content to the display 120 for rendering.

Figure 3:
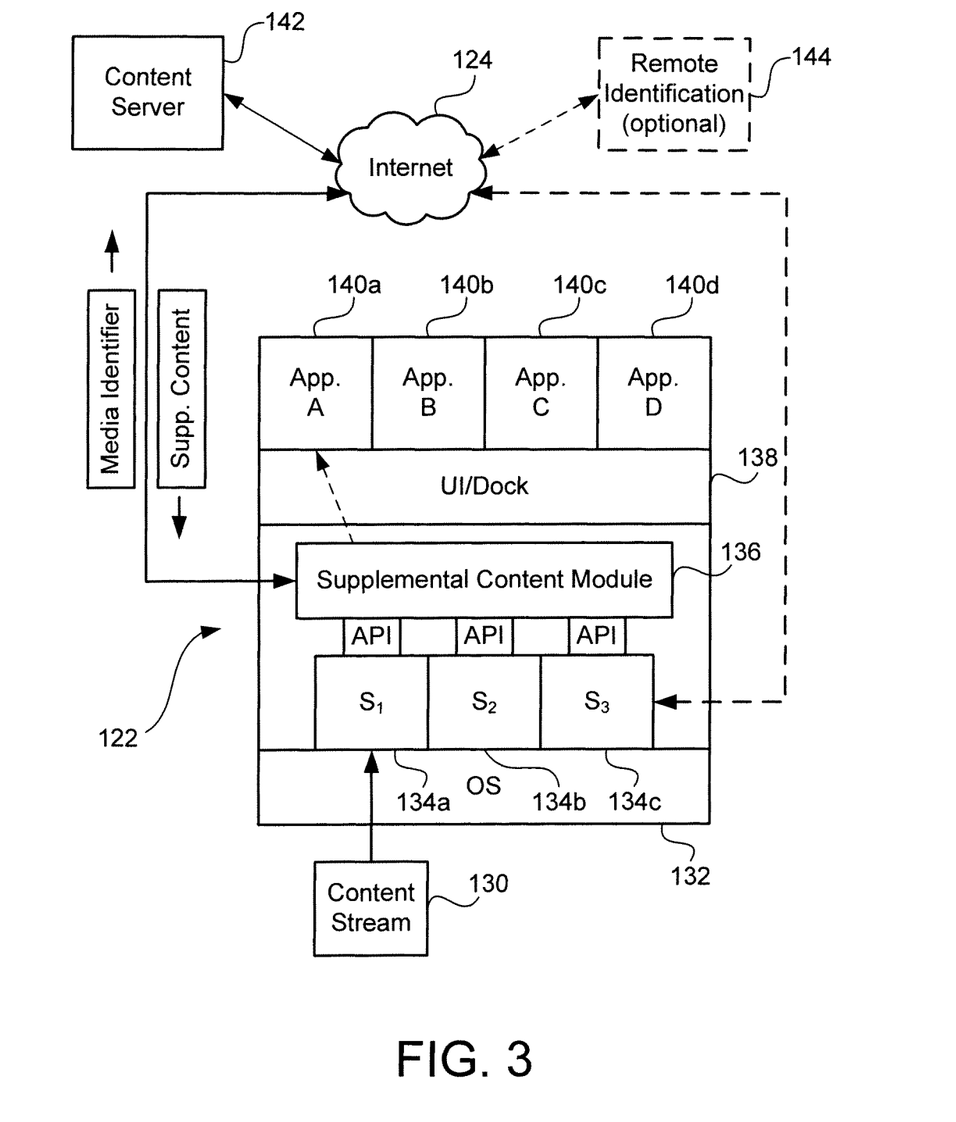
FIG. 3 illustrates a connected interface module 122, in accordance with an embodiment of the invention.

FIG. 3 illustrates a connected interface module 122, in accordance with an embodiment of the invention. The connected interface module 122 as shown is represented as a stack so as to illustrate various components of the connected interface module 122. The connected interface module 122 is implemented over an operating system (OS) 132 of the device in which the connected interface module 122 is situated. For example, in one embodiment the OS 132 is the operating system of a display device in which the connected interface module 122 is located. The OS provides access to low level features of the device in which the connected interface module 122 is located. The connected interface module 122 receives a content stream 130 from a source such as a set-top box or cable line.

The connected interface module 122 includes one or more sensor modules for determining content of the content stream

130. In the illustrated embodiment, sensor modules 134a, 134b, and 134c are shown. However, in various embodiments of the inventions, there may be any number of sensor modules. In one embodiment, a sensor module determines media content of the content stream by sampling a portion of the content stream and analyzing the sampled portion. The sensor module generates a media identifier for the sampled portion. The media identifier may indicate a unit of content in which the sampled portion is found, as well as other information such as the location within the unit of content at which the sampled portion is found.

In various embodiments, a sensor module may utilize various technologies to determine the media content of the content stream 130. For example, in one embodiment, a sensor module may generate a fingerprint or code of a sampled portion of the content stream. The fingerprint is analyzed, such as by matching against a fingerprint database, in order to determine the media content of the sampled portion. In some embodiments, sensor modules may utilize remote identification 144 to determine the media content of a sampled portion of the content stream. Thus, by way of example, a fingerprint generated from a sampled portion of the content stream may be sent to a remote identification server 144 which analyzes the fingerprint and returns a media identifier which identifies the contents of the sampled portion.

In one embodiment, a sensor module detects the presence of a digital watermark in the content stream, and utilizes the digital watermark to determine the media content of the content stream. In other embodiments, the sensor module may utilize any available information in the sampled portion of the content stream, such as metadata, audio data, video data, or any other type of information present in the sample which may be analyzed to determine media content of the content stream. A sensor module may utilize multiple types of data simultaneously in order to ascertain media content of the sampled portion. For example, metadata embedded in the sample may first be detected so as to determine a unit of content in which the sampled portion is found. Then a more fine-grained analysis of an audio or video fingerprint could be utilized to determine the precise location within the unit of content at which the sampled portion is located. Note that the analysis of the sampled portion of the content stream may be performed at the sensor module itself or remotely.

In other embodiments of the invention, the sensor may be configured to retrieve information about the content stream from known sources such as another module or device. For example, in one embodiment, the sensor queries the set-top box to determine a media identifier which identifies the contents of the content stream. In such an embodiment, the set-top box is configured to determine media identification information about the content stream, which may be based on any of various methods for determining such information, such as analysis of the content stream, or retrieval from external sources.

In one embodiment, the set-top box includes a stream processing module for processing the content stream, and an external API for handling information requests from the sensor. The stream processing module reads metadata from the content stream (which may be received live from a signal provider or from a prerecorded source such as a hard drive in a DVR system). The metadata is then processed to determine the media content of the content stream (e.g. processing the metadata using a translation file or data). The sensor queries the STB's external API, which retrieves the determined media content of the content stream from the processing module, and sends it to the sensor. In an alternate embodiment, the read metadata may be passed along to the sensor, which in turn applies a translation file or data to determine the media identification information of the content stream.

In still other embodiments, portions of the metadata are processed while other portions are not, so that the sensor receives a mixture of both processed and unprocessed metadata. By way of example, the processed portions of metadata may provide an initial level of media identification to the sensor, while a more detailed level of media identification is achieved after further processing the unprocessed metadata. In various embodiments, the sensor may process the unprocessed metadata or further pass it along to other processing modules or to an external server for processing.

In embodiments of the invention wherein multiple sensor modules are provided, each of the sensor modules may be configured to detect different things. Moreover, the sensor modules may be configured to be activated only during certain times, such as during specific programs, or may be activated continuously. Moreover, sensor modules may be activated remotely. For example, in one embodiment, a sensor module may be configured to detect a particular program or commercial for which supplemental content can be offered. If it is known that the program or commercial is aired during a certain time of day, then the sensor may be configured to be activated (automatically or remotely) during those times that the program or commercial is aired.

In some embodiments, a sensor module may trigger the activation of another sensor module. For example, it may be known that a certain commercial for which supplemental content can be offered appears only when certain programs are aired. Sensor module 134a might be configured to detect when the user is watching one of these specific programs. When sensor module 134a detects that the user is watching one of the programs, then sensor module 134b might be activated to detect when the user is viewing the particular commercial. In this manner, a sensor module may be activated only as needed so as to conserve system resources such as memory and CPU.

It will be understood by those skilled in the art that in various embodiments of the invention, the sensor module may be embodied in various forms, including various combinations of software and hardware. By way of example only, and not by way of limitation, the sensor module may be embodied as or in an application, applet, module, patch, logic-encoded chip, code or program instructions executed by a processor, or any of various other types of software or hardware or combinations thereof which may be configured to operate as a sensor module has herein described.

The sensor modules 134a, 134b, and 134c communicate with supplemental content module 136 via the supplemental content module's API. In one embodiment, a sensor module communicates a media identifier to the supplemental content module 136. The media identifier indicates a unit of content in which the sampled portion is found, and may also indicate the specific location within the unit of content at which the sampled portion is found. For example, the media identifier can indicate what specific program or commercial is being watched, as well as what point in the program or commercial the user is currently watching (or has just recently watched). In one embodiment, the indication of the location within a unit of content may be via a time code or frame number, though in other embodiments, other types of measurements for indicating location with a unit of content may be utilized.

The supplemental content module uses the media identifier to determine if supplemental content can be offered, and if so, then retrieves the supplemental content from a content server 142. In one embodiment, the supplemental content module 136 communicates the media identifier, or a portion thereof, to the content server 142. The content server 142 returns supplemental content relevant for the media content being watched by the user, as indicated by the media identifier.

The supplemental content is displayed with the content stream. In one embodiment, the supplemental content provides access to an interactive feature. Examples of interactive features which may be supplied by way of the supplemental content are numerous and may include, without limitation, information about or related to a given program or commercial, a user feedback mechanism, related services, advertisements, a voting mechanism, etc. In one embodiment, the supplemental content may trigger activation of an application or widget such as application 140*a*, 140*b*, 140*c*, or 140*d*. The activation of the application may be automatic based on receipt of the supplemental content by the supplemental content module 136, or may be in response to a user interacting with the supplemental content in such a manner as to trigger activation of the application. Note that the activation of the application via the supplemental content is separate and apart from the activation of such an application via the resident UI/dock 138 from which a user may launch an application on their own. According to embodiments of the invention, the application is launched based on the detected media content of the content stream which the user is viewing.

Figure 4:
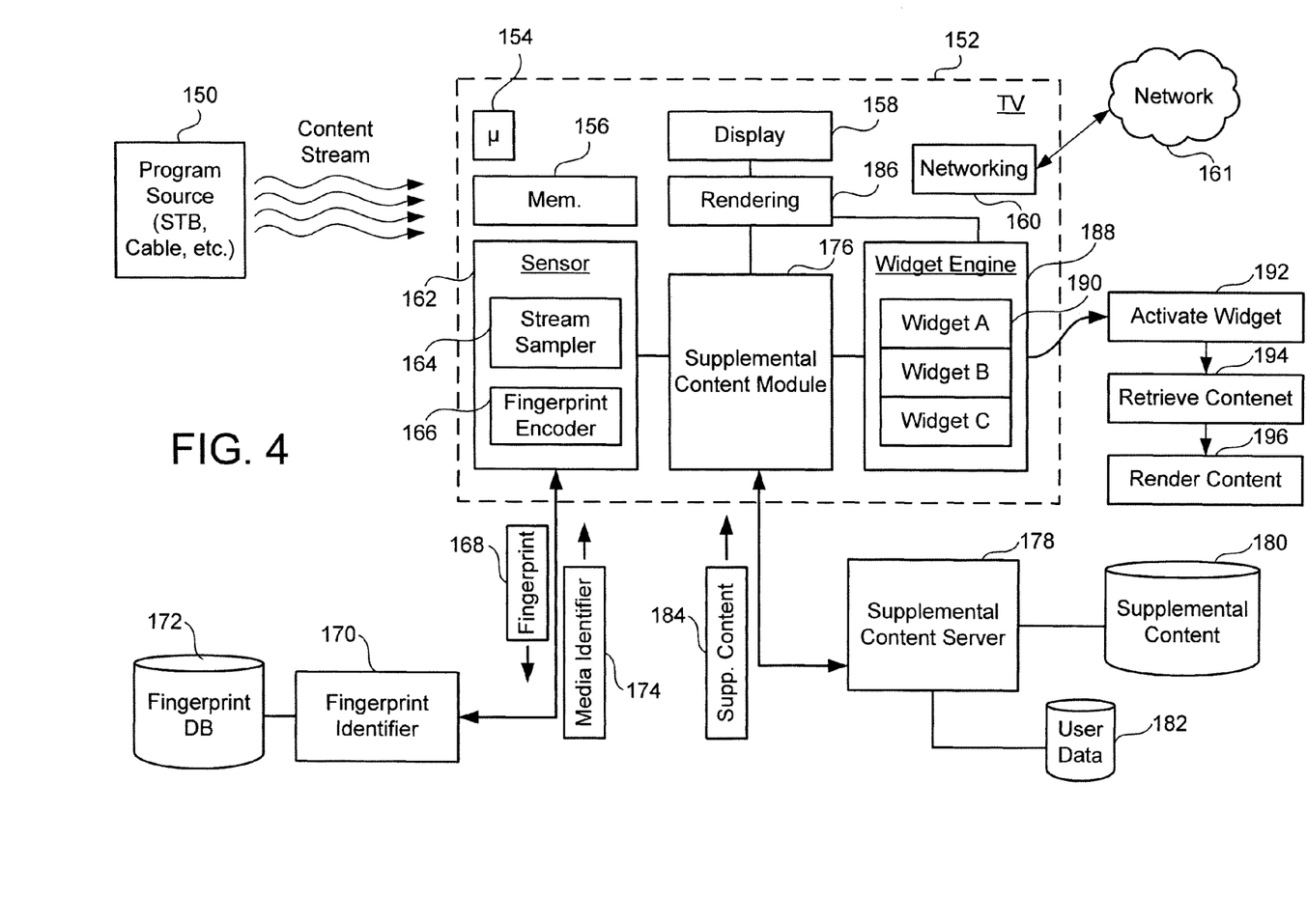
FIG. 4 illustrates a system for providing supplemental content with a content stream, in accordance with an embodiment of the invention.

FIG. 4 illustrates a system for providing supplemental content with a content stream, in accordance with an embodiment of the invention. A program source 150 provides a content stream to a display 152. The display 152 includes a processor 154 and memory 156 for executing program instructions. Media content such as that of the content stream is rendered on a visual display 158. The display 152 includes networking module 160, which enables connection to a network 161, such as the Internet. Network 161 may include any of various networks which enable access to remote servers, such as a LAN, WAN, and the Internet.

A sensor 162 includes a stream sampler 164 for sampling a portion of the content stream. A fingerprint encoder 166 encodes the sampled portion of the content stream into a digital fingerprint 168 for analysis to determine the media content of the content stream. The fingerprint 168 is sent to a fingerprint identifier 170. The fingerprint identifier 170 cross-references the fingerprint 168 against a fingerprint database 172 to determine the media content from which the fingerprint was taken. The fingerprint identifier 170 thus returns a media identifier 174 which indicates a unit of content in which the sampled portion of the content stream exists, as well as the specific location within the unit of content at which the sampled portion is found. For example, the media identifier 174 may indicate a temporal location within a particular program or commercial.

The sensor 162 transmits the media identifier 174 to the supplemental content module 176. The supplemental content module 176 accesses a supplemental content server 178, and, using the media identifier 174, retrieves supplemental content 184 from the supplemental content server 178. The supplemental content server 178 accesses a supplemental content database 180, which contains supplemental content corresponding to media identification information. Thus, the supplemental content server 178 retrieves the supplemental content which corresponds to the identified media content of the content stream as indicated by the media identifier. Additionally, the supplemental content server 178 may access a user data storage 182 so as to determine characteristics of the particular user that is watching the content stream on the display 152. These characteristics may be considered in determining which supplemental content to return. For example, characteristics of the user, such as geographic location, age, gender, favorite shows, television viewing habits or statistics, etc., may be utilized in determining supplemental content 184. In one embodiment, the user is presented with a menu of options for setting which user data may be utilized by the system to determine supplemental content.

The supplemental content module 176 retrieves the supplemental content 184 from the supplemental content server 178, and a rendering module 186 renders the supplemental content 184 with the content stream on the visual display 158. In one embodiment, the supplemental content may cause activation of a widget engine 188 so as to activate one or more widgets 190. The supplemental content may trigger such activation automatically or as a result of user interaction with the rendered supplemental content. In this regard, the widget engine 188 may activate a widget at method operation 192. The widget may retrieve content at method operation 194. And the content from the widget is rendered at method operation 196.

Figure 5:
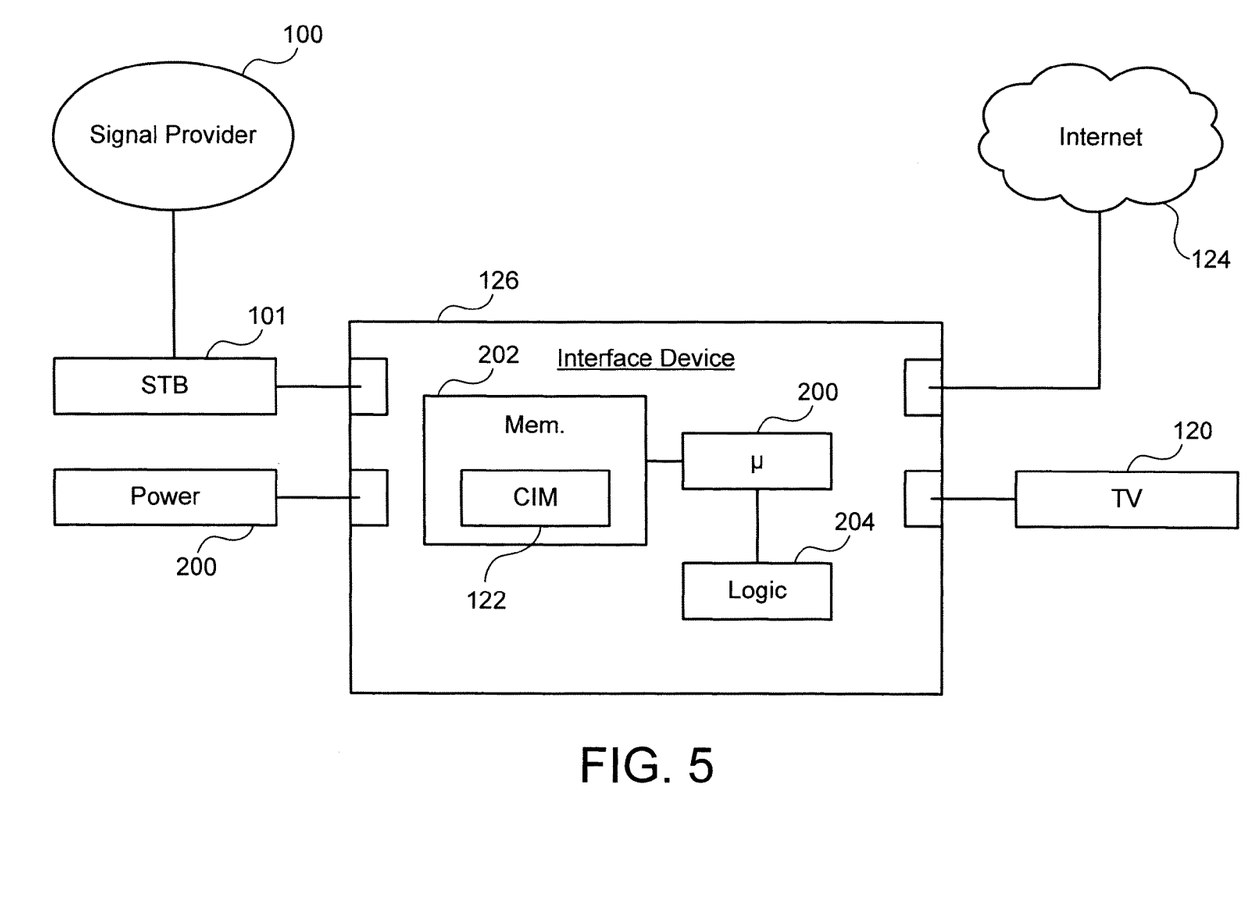
FIG. 5 illustrates a system for providing supplemental content with a content stream, in accordance with an embodiment of the invention.

FIG. 5 illustrates a system for providing supplemental content with a content stream, in accordance with an embodiment of the invention. An interface device interfaces between a STB 101 and a display 120. The interface device 126 receives power from a power source 200, and is connected to the Internet 124. The interface device 126 includes a processor 200, memory 202, and logic 204 for executing program instructions and performing various operations. The interface device 126 includes a connected interface module 122, which, as previously described, is configured to detect media content of a content stream provided from the STB 101, and retrieve related supplemental content via the Internet 124 based on the identified media content of the content stream. The content stream is rendered on the display 120 along with the supplemental content. The supplemental content may provide access to interactive features, and provide internet communication during the receipt of the content stream.

Figure 6:
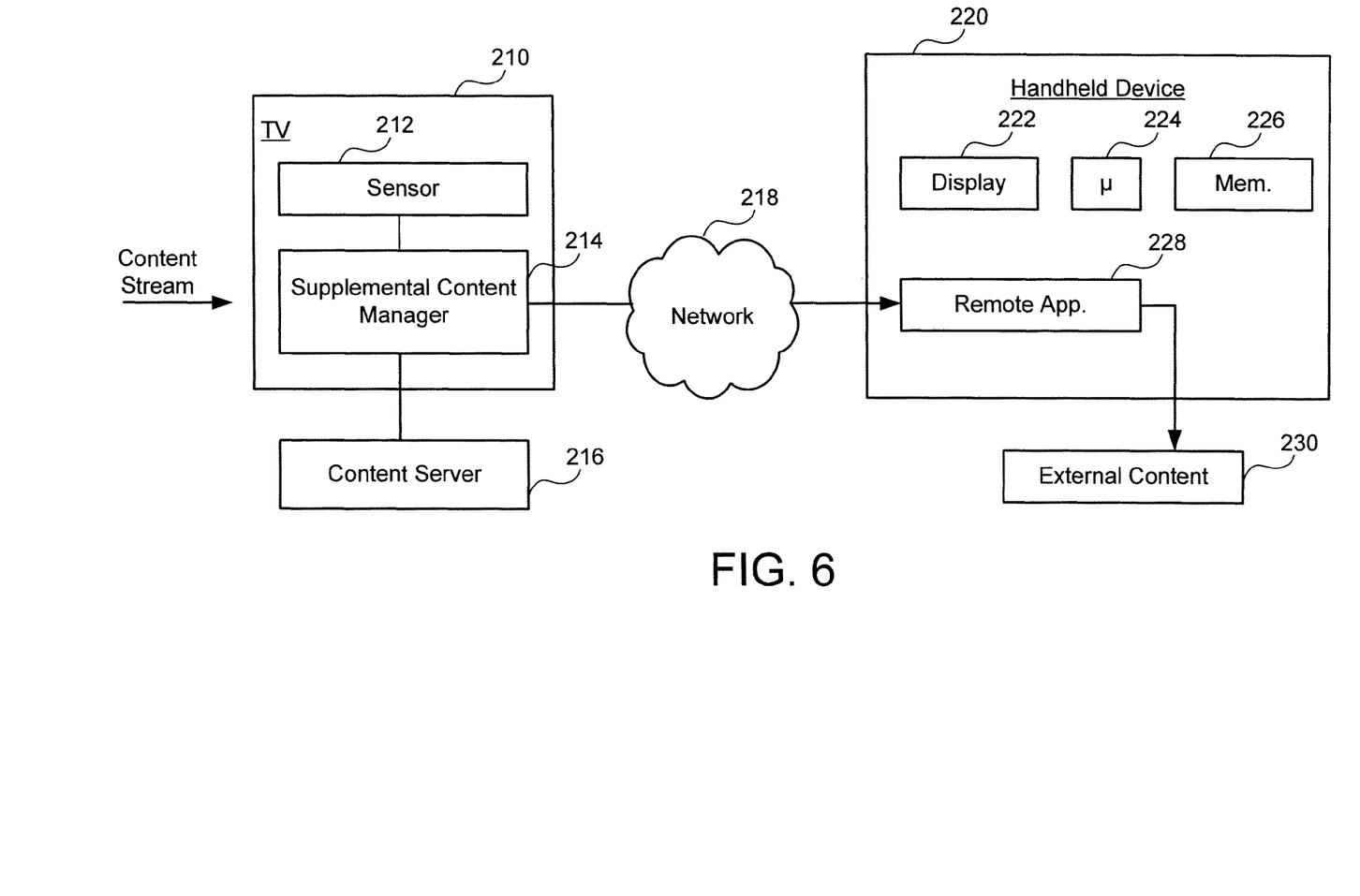
FIG. 6 illustrates a system for providing supplemental content on a handheld device simultaneous with rendering of a content stream on a display, in accordance with an embodiment of the invention.

FIG. 6 illustrates a system for providing supplemental content on a handheld device simultaneous with rendering of a content stream on a display, in accordance with an embodiment of the invention. A display 210 receives a content stream containing media content. The display 210 includes a sensor 212 for detecting the media content of a content stream, including identification of a unit of content (such as a specific program or commercial) which the received content stream is currently transmitting, and a current location within the unit of content. A supplemental content manager 214 retrieves supplemental content from a content server 216 based on the detected media content of the content stream. The supplemental content may be rendered on the display 210 with the content stream, and provide access to interactive features.

In one embodiment, the supplemental content triggers or activates (either automatically, or in response to user interaction with the supplemental content) a remote application 228 on a handheld device 220. The supplemental content manager 214 communicates with the remote application 228 of the handheld device 220 via a network 218. The network 218 may be a local network, such as a WiFi network, or may be other types of networks such as the Internet. The handheld device 220 includes a visual display 222 for rendering the remote application 228, as well as a processor 224 and memory 226 for executing program instructions and performing various operations.

In one embodiment, the remote application 228 receives supplemental content from the supplemental content manager 214, and renders it on the visual display 222 of the handheld device 220. In another embodiment, the remote application 228 may receive information about the media content of the content stream, and in response, connect to an external content server 230 to access external content. The external content may provide an interactive feature that is related to the media content of the content stream being rendered on the display 210. In this manner, the user is provided with enhanced features on their handheld device simultaneous with and related to a media program that is currently being rendered on their television. In still other embodiments, the content server 216 may directly communicate with the remote application 228 on the handheld device 220 so as to provide supplemental content for rendering on the handheld device 220.

It will be appreciated by those skilled in the art that the handheld device 220 may be any of various types of handheld devices, including, without limitation, a cellular phone, smart-phone, personal digital assistant (PDA), portable gaming device, tablet computer, laptop computer, or any other type of handheld device which can connect to a network so as to provide additional content related to detected media content of a content stream rendered on a display.

Figure 7:
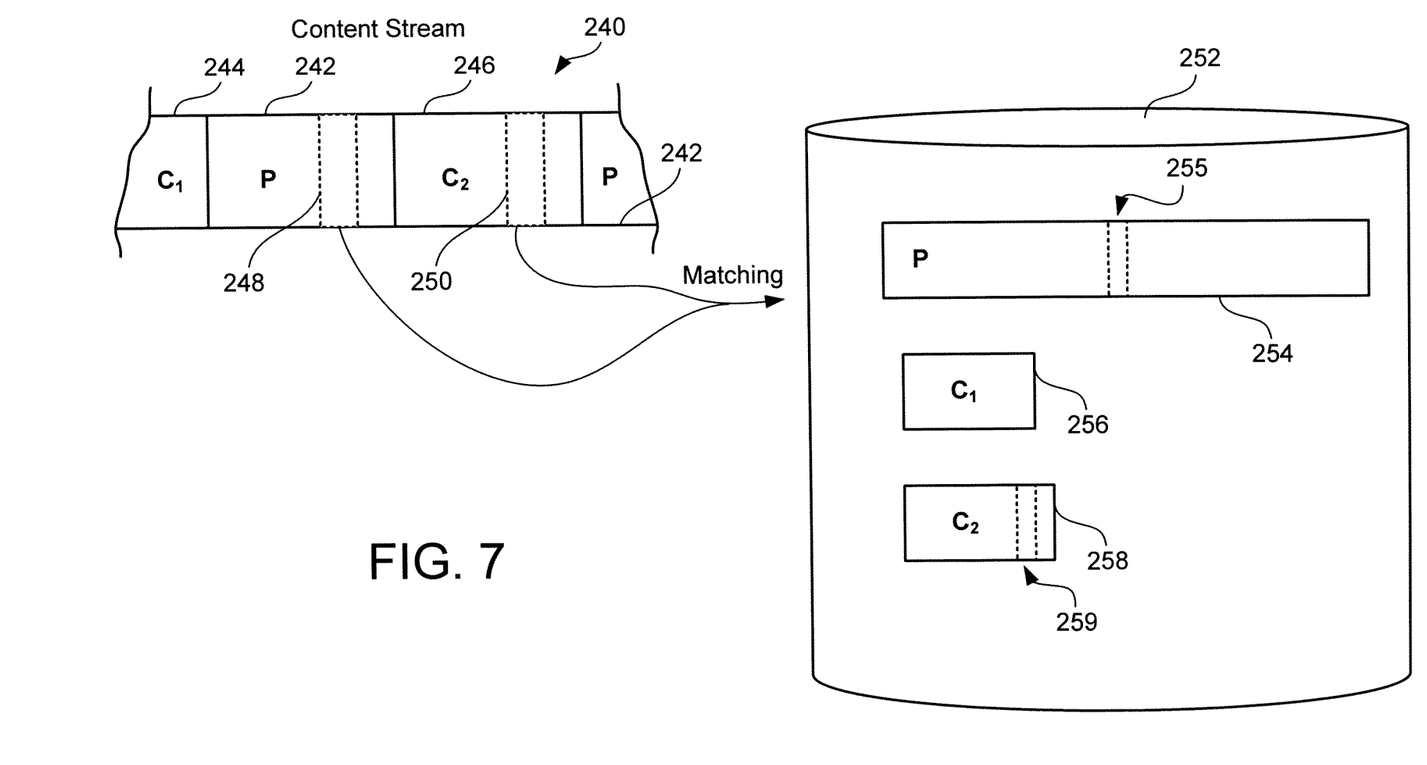
FIG. 7 schematically illustrates the sampling of a content stream in order to determine its media content, in accordance with an embodiment of the invention.

FIG. 7 schematically illustrates the sampling of a content stream in order to determine its media content, in accordance with an embodiment of the invention. A content stream 240 includes program portions 242 of a program P, and commercials C1 and C2 interposed between the program portions 242 at locations 244 and 246. A portion 248 of the content stream 240 is sampled, the sampled portion 248 being from the program portion 242 of the content stream. In order to determine the media content of the sampled portion 248, in one embodiment, a fingerprint of the sampled portion 248 is generated. The fingerprint is matched against a fingerprint database 252, which contains fingerprint data 254, 256, and 258 of the program P, commercial C1, and commercial C2, respectively. By matching the fingerprint of sampled portion 248 against the fingerprint data 254, it is possible to identify the specific program from which the sampled portion 248 was taken (program P), as well as the specific location within program P (location 255) at which the sampled portion 248 is found.

As another example, a portion 250 is sampled from the content stream. A fingerprint of sampled portion 250 is generated and matched against the fingerprint database 252. Based on this matching, it is determined that the sampled portion 250 is from commercial C2, and more specifically, found at location 259 within commercial C2. Based on the identified media content of the sampled portions of the content stream, supplemental content and interactive features may be presented to the user.

Figure 8:
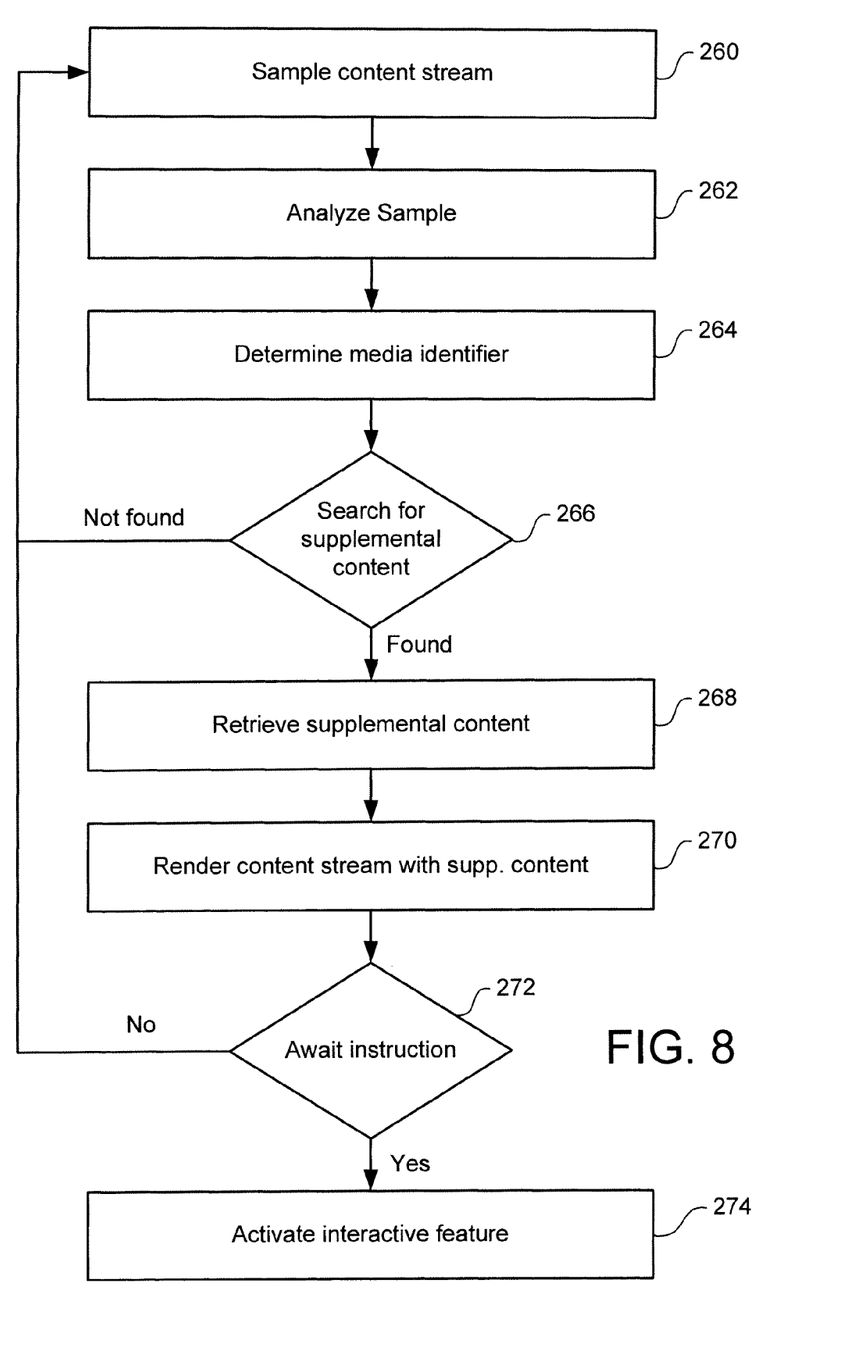
FIG. 8 illustrates a method for displaying supplemental content with a content stream, in accordance with an embodiment of the invention.

FIG. 8 illustrates a method for displaying supplemental content with a content stream, in accordance with an embodiment of the invention. At method operation 260, a portion of a content stream is sampled. At method operation 262, the sample is analyzed, such as via digital fingerprint technology, analysis of metadata, or other analysis technologies which are relevant to ascertaining the contents of a content stream. At method operation 264, a media identifier is determined for the sample based on the analysis, the media identifier indicating a program or commercial or other unit of content in which the sample is found. At method operation 266, a search is conducted to determine is supplemental content exists for the media identifier. If supplemental content is not found, the method returns to method operation 260. If supplemental content is found which corresponds to the media identifier, then at method operation 268, the supplemental content is retrieved. At method operation 270, the supplemental content is rendered on a display along with the content stream. At method operation 272, the method awaits an instruction from the user. If the user provides no instruction, then the supplemental content is withdrawn from display, and the method returns to method operation 260. If the user provides an instruction, then at method operation 274, an interactive feature is activated.

Figure 9:
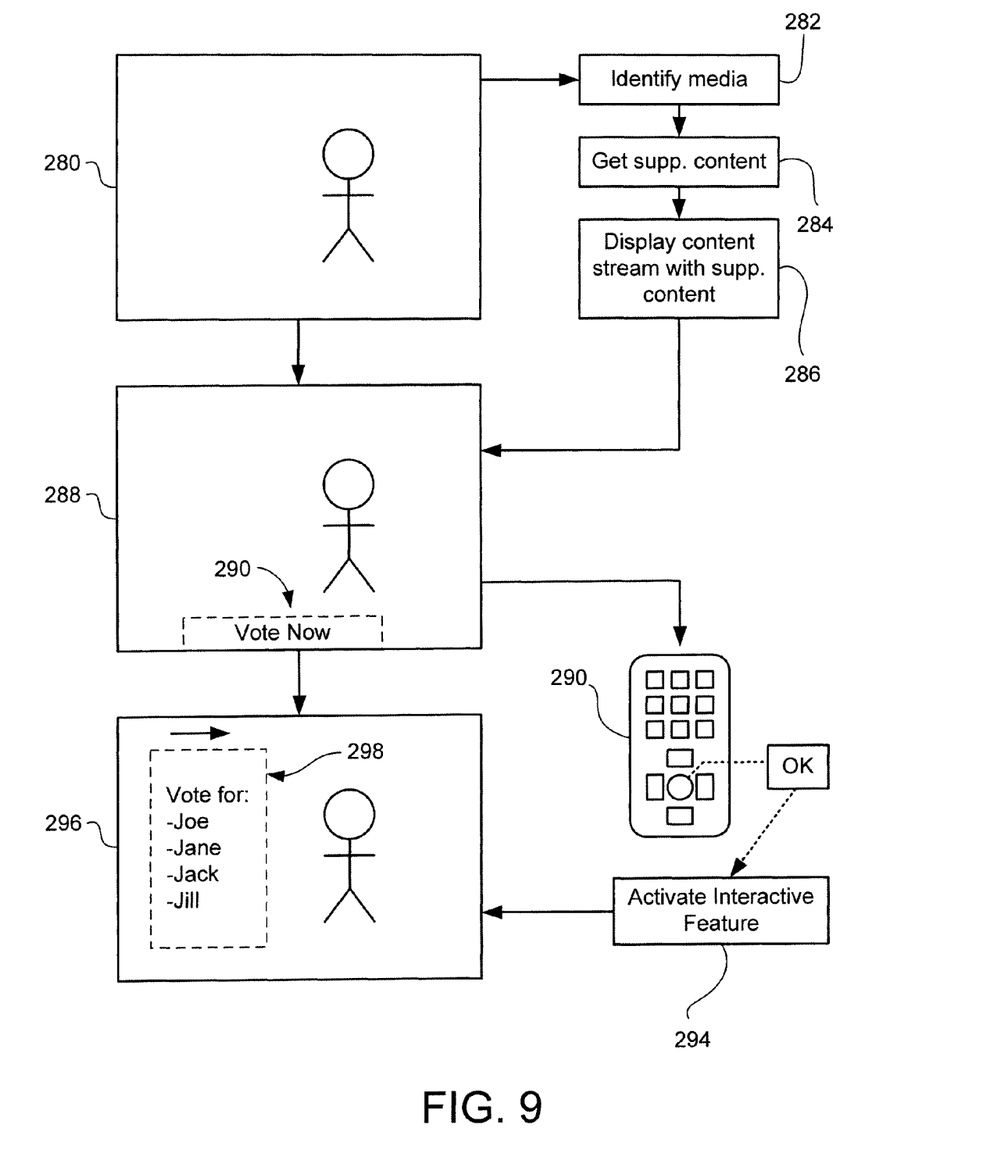
FIG. 9 illustrates a series of screenshots showing rendering of supplemental content with a content stream, in accordance with an embodiment of the invention.

FIG. 9 illustrates a series of screenshots showing rendering of supplemental content with a content stream, in accordance with an embodiment of the invention. Screenshot 280 shows a content stream as it is rendered on a display. In accordance with embodiments of the invention herein described, at operation 282, media content of the content stream is identified based on sampling and analysis of the content stream. At operation 284, supplemental content relating to the media content of the content stream is retrieved. And at operation 286, the content stream is rendered on the display with the supplemental content. This is shown at screenshot 288. As shown, the supplemental content provides a message 290 at the bottom of the screen, indicating that the user can activate an interactive feature such as a voting mechanism. The user may indicate that they wish to vote by clicking an appropriate button on their remote control 290 (such as the Enter or OK button). And at operation 294, the interactive feature is activated. This is shown by screenshot 296, wherein an interactive frame 298 is provided on the display, indicating that the user may vote for one of the characters on the show that is currently being watched.

The aforementioned embodiment is provided by way of example only, and not by way of limitation. In other embodiments, any of various types of supplemental content and interactive features may be provided according to systems and methods of the present invention. For example, in one embodiment, a commercial may be enhanced by providing a list or map of nearby locations for the service or good being advertised. In another embodiment, related advertisements to content being displayed could be presented. In still other embodiments, interactive features related to particular programs could be displayed, such as voting or feedback features which enable the user to participate in a show in a dynamic fashion while watching the show. In another embodiment, a user could discover information related to what is being watched, such as via internet search results or other sources of information. It will be appreciated by those skilled in the art that numerous other embodiments may provide various types of supplemental content and interactive features based on detected content of a content stream, in accordance with embodiments of the invention herein described.

Embodiments of the invention as herein described may utilize relational database systems as are known in the art. Examples of such database systems include MySQL, Oracle, and Access. Various operations as described above may be effected by performance of an operation via a relational database management system. Such database systems may be embodied in one or more server computers, which may be configured as part of a network of computers.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data may be processed by other computers on the network, e.g. a cloud of computing resources.

The embodiments of the present invention can also be defined as a machine that transforms data from one state to another state. The data may represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine.

The invention can also be embodied as computer readable code on a computer readable medium. The computer readable medium may be any data storage device that can store data, which can thereafter be read by a computer system. Examples of the computer readable medium include hard drives, network attached storage (NAS), read-only memory, random-access memory, FLASH based memory, CD-ROMs, CD-Rs, CD-RWs, DVDs, magnetic tapes, and other optical and non-optical data storage devices. The computer readable medium can also be distributed over a network coupled computer systems so that the computer readable code may be stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for displaying supplemental content on a display, comprising:

receiving a content stream for a video program in memory of the display via a first channel for rendering on the display;

periodically sampling, at the display, a portion of the received content stream from the memory of the display;

generating, at the display, an audio fingerprint of the sampled portion;

sending the audio fingerprint from the display to a remote server having a fingerprint identifier logic that is configured to determine a media identifier by comparing the audio fingerprint to audio fingerprints of video programs stored in a database, the media identifier being configured to identify the video program being rendered from the content stream on the display;

receiving at the display from the remote server, after processing by the fingerprint identifier logic, the media identifier;

retrieving supplemental content from a content server using the media identifier via a second channel that is separate from the first channel, the supplemental content being defined for the video program identified by the media identifier;

rendering the content stream on the display with the supplemental content, the supplemental content providing access to an interactive feature, the interactive feature providing internet communication during the receipt of the content stream.

2. The method of claim 1, wherein the media identifier identifies a location within the video program at which the sampled portion is found.

3. The method of claim 1, wherein the supplemental content defines a trigger for accessing the interactive feature.

4. The method of claim 3, wherein the interactive feature is provided by an application, the application being launched by the trigger.

5. The method of claim 1, wherein the first channel is defined by a communication selected from the group consisting of analog audio/video, digital audio/video, cable, satellite, or internet; and wherein the second channel is defined by internet communication.

6. The method of claim 1, wherein the content stream is defined by audio and video content of the video program.

7. A method for a content server to provide supplemental content to a display, comprising:

determining supplemental content using a media identifier for a content stream, the content stream being received in memory of the display via a first channel for rendering on the display, the media identifier being determined based on analysis of a sampled portion of the content stream from the memory of the display, the media identifier being configured to identify a video program being rendered from the content stream and a location within the video program at which the sampled portion is found, the media identifier being determined by comparing an audio fingerprint, that is generated from the sampled portion of the content stream, to audio fingerprints of video programs stored in a database, the supplemental content being defined for the video program and the location identified by the media identifier;

transmitting the supplemental content to a rendering logic, the rendering logic rendering the content stream on the display with the supplemental content, the supplemental content providing access to an interactive feature, the interactive feature providing internet communication during the receipt of the content stream.

8. The method of claim 7 wherein the supplemental content defines a trigger for accessing the interactive feature.

9. The method of claim 8, wherein the interactive feature is provided by an application, the application being launched by the trigger.

10. A system for displaying a content stream with supplemental content on a display, comprising:
   a content server for providing supplemental content;
   an interface device, the interface device including a connected interface logic;
   wherein the connected interface logic includes:
   (a) a sensor for receiving a content stream for a video program in memory of the display via a first channel for rendering on the display, periodically sampling, at the display, a portion of the received content stream from the memory of the display, generating an audio fingerprint of the sampled portion, sending the audio fingerprint to a remote server having a fingerprint identifier that is configured to determine a media identifier by comparing the audio fingerprint to audio fingerprints of video programs stored in a database, and receiving from the remote server, after processing by the fingerprint identifier, the media identifier, the media identifier being configured to identify the video program being rendered from the content stream;
   (b) a supplemental content logic for retrieving, via a second channel that is separate from the first channel, supplemental content from the content server using the media identifier, the supplemental content being defined for the video program identified by the media identifier;
   (c) a rendering logic for rendering the content stream on the display with the supplemental content, the supplemental content providing access to an interactive feature, the interactive feature providing internet communication during the receipt of the content stream.

11. The system of claim 10, wherein the media identifier identifies a location within the video program at which the sampled portion is found.

12. The system of claim 10, wherein the supplemental content defines a trigger for accessing the interactive feature.

13. The system of claim 12, wherein the interactive feature is provided by an application, the application being launched by the trigger.

14. A system for displaying a content stream with supplemental content on a display, comprising:
   a content server for providing supplemental content;
   a display, the display including a connected interface logic;
   wherein the connected interface logic includes:
   (a) a sensor for receiving a content stream for a video program in memory of the display via a first channel for rendering on the display, periodically sampling, at the display, a portion of the received content stream from the memory of the display, generating an audio fingerprint of the sampled portion, sending the audio fingerprint to a remote server having a fingerprint identifier that is configured to determine a media identifier by comparing the audio fingerprint to audio fingerprints of video programs stored in a database, and receiving from the remote server, after processing by the fingerprint identifier, the media identifier, the media identifier being configured to identify the video program being rendered from the content stream;
   (b) a supplemental content logic for retrieving, via a second channel that is separate from the first channel, supplemental content from the content server using the media identifier, the supplemental content being defined for the video program identified by the media identifier;
   (c) a rendering logic for rendering the content stream on the display with the supplemental content, the supplemental content providing access to an interactive feature, the interactive feature providing internet communication during the receipt of the content stream.

15. The system of claim 14, wherein the media identifier identifies a location within the video program at which the sampled portion is found.

16. The system of claim 14, wherein the supplemental content defines a trigger for accessing the interactive feature.

17. The system of claim 16, wherein the interactive feature is provided by an application, the application being launched by the trigger.

18. A method for displaying supplemental content on a television, comprising:
   receiving in memory of the television a content stream for a video program from a set-top box;
   periodically sampling, at the television, a portion of the received content stream from the memory of the television;
   generating, at the television, an audio fingerprint of the sampled portion;
   sending the audio fingerprint from the television to a remote server having a fingerprint identifier that is configured to determine a media identifier by comparing the audio fingerprint to audio fingerprints of video programs stored in a database, the media identifier being configured to identify the video program being rendered from the content stream and a location within the video program at which the sampled portion is found;
   receiving at the television from the remote server, after processing by the fingerprint identifier, the media identifier;
   retrieving, via the Internet, supplemental content from a content server using the media identifier, the supplemental content being defined for the video program identified by the media identifier;
   rendering the content stream on the television with the supplemental content, the supplemental content providing access to an interactive feature, the interactive feature providing Internet communication during the receipt of the content stream in response to user interaction with the interactive feature.

* * * * *